March 15, 1938. H. G. AXTMANN 2,111,503
BRAKE
Filed Aug. 1, 1935 2 Sheets-Sheet 1
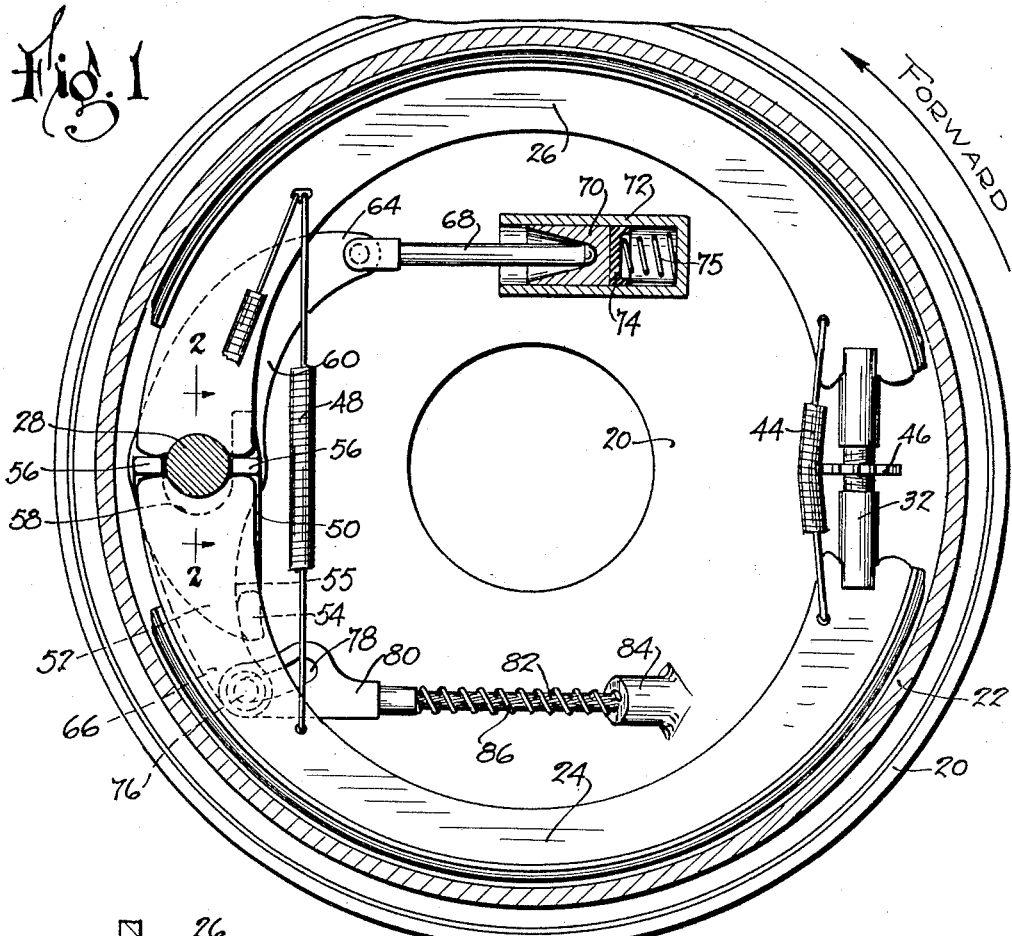
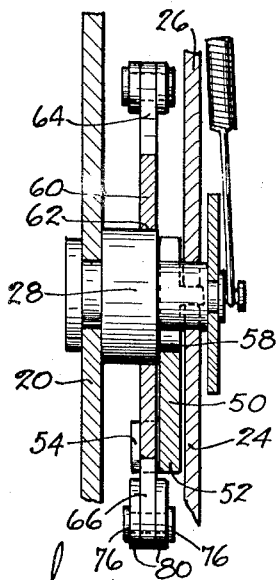
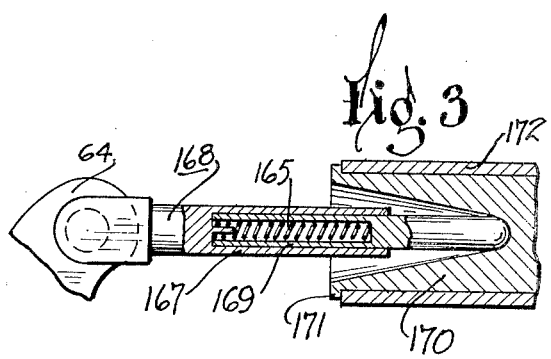
INVENTOR.
HAROLD G. AXTMANN
BY Jerome R. Cox
ATTORNEY.

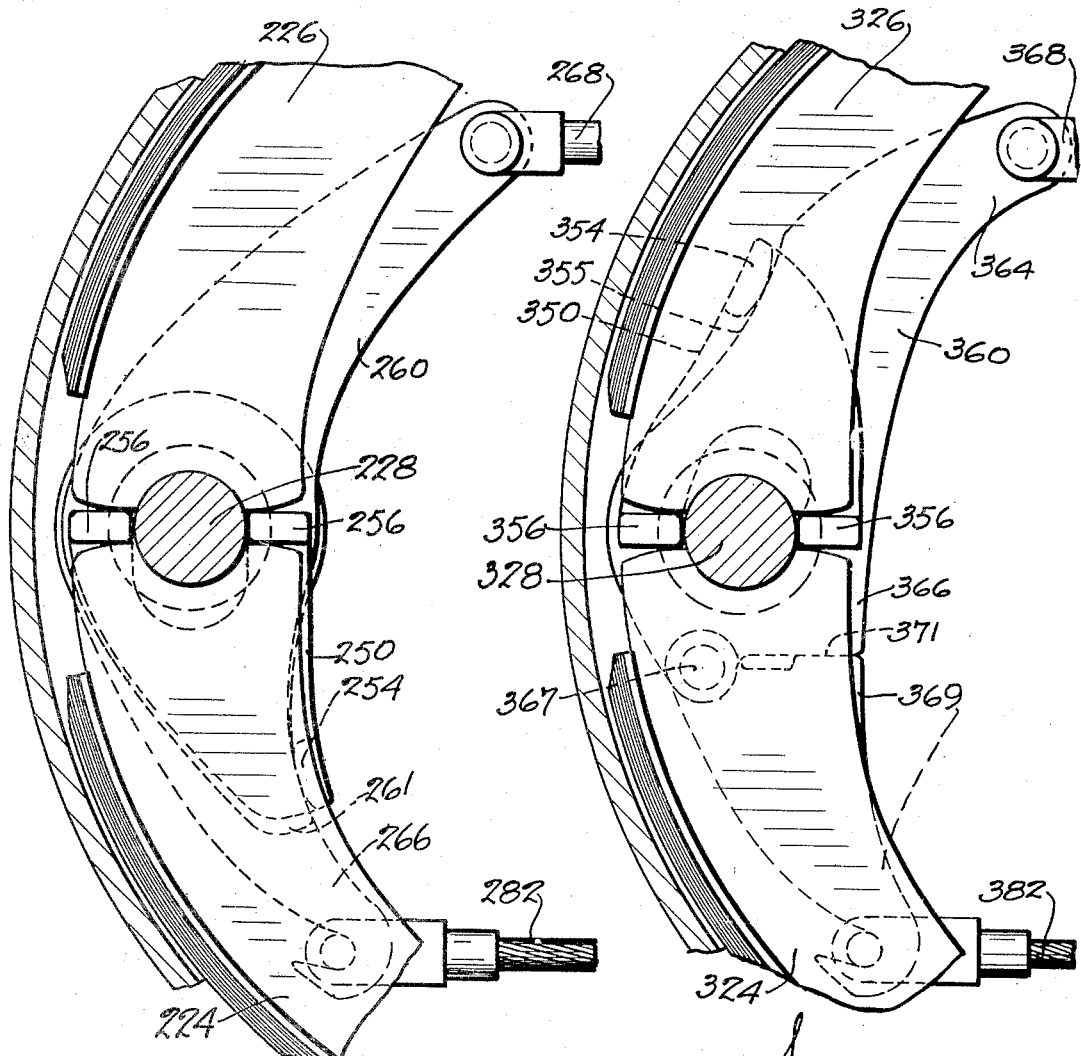

Patented Mar. 15, 1938

2,111,503

UNITED STATES PATENT OFFICE 2,111,503

BRAKE

Harold G. Axtmann, River Grove, Ill., assignor to Bendix Products Corporation, South Bend, Ind., a corporation of Indiana Application August 1, 1935, Serial No. 34,236

10 Claims. (Cl. 188—106)

This invention relates to brakes and is illustrated as embodied in a brake of the internal expanding single anchor type wherein floating friction shoes are used.

In my copending application Serial No. 625,494, filed July 28, 1932, I disclosed an invention of an "equal action cam" intended to overcome difficulties previously had in providing an actuating cam readily adapted to float with the shoes and actuating the shoes equal amounts regardless of the direction of rotation of the brake.

It is at times desirable to provide two separate means for applying such a brake. For instance, it may be desired to operate the brake either hydraulically or mechanically. In applying the principle of the "equal action cam" to a brake actuated by two separate applying means, difficulties were encountered by reason of the fact that it is highly desirable that each applying means be allowed to remain in its neutral position while the brake is being actuated by the other applying means and in that the available space within a brake drum is quite limited.

It is accordingly an object of this invention to provide a brake applying mechanism having two separate actuating means and having applying means free to float with the brake shoes and so arranged that it corrects the errors in the distances moved in the opposite directions of rotation.

A further object is to provide means to allow each of the applying means to remain in its inactive position while the brake is being applied by the other applying means.

A further object is the elimination of parts and simplification of construction in such a device, so that there may be adequate room within the drum for the brake structure.

Further objects and features of the invention will appear from a reading of the subjoined specification and claims and from a consideration of the accompanying drawings, in which:

Figure 1 is a view in section of a brake disclosing one form of my invention;

Figure 2 is an enlarged view in section taken on the line 2—2 of Figure 1;

Figure 3 is a view in section showing on an enlarged scale a fragment corresponding to a portion of Figure 1 and showing in detail the construction of the piston rod;

Figure 4 is an enlarged fragmentary view showing an alternate form of my invention; and Figure 5 is another enlarged fragmentary view showing another modified form of my invention.

Referring to Figures 1 and 2, it will be seen that there is shown a brake having a backing plate 20, a brake drum 22, friction shoes 24 and 26, and an anchor 28. At one end the shoes are notched so as to receive the notched ends of an adjustment link 32 and a spring 44 connects the shoes together and engages the notched periphery of an adjustment wheel 46.

The other ends of the shoes each have a concave contour, and these ends are urged into engagement with the anchor 28 by any suitable means such as a spring 48. Floatingly mounted on the anchor 28 is a cam lever 50. The lever 50 has an arm 52 and at the end thereof is provided with a lug 54 by which it may be turned. The lever 50 is also provided with lugs 56 which extend between the ends of the shoes and which are adapted (when the cam lever is turned) to urge the shoes 24 and 26 away from the anchor 28.

In order that the cam lever 50 may float freely with respect to the anchor, a large slotted aperture 58 is provided therein so that the cam lever 50 clears the anchor adequately during all normal operations of the brake. To actuate the cam I provide a second lever 60 which is pivoted on the anchor as at 62 and which is formed with a cam surface 55 adapted to contact the lug 54 to actuate the cam lever 50. I provide the lever 60 with arms 64 and 66, each of which is connected to a separate means of actuation. The arm 64 is pivotally connected to a piston rod 68 through which applying force may be exerted by a piston 70 working in a wheel cylinder 72 secured to the backing plate 20. The piston 70 is provided with a packing cup 74 which is held in contact with the piston by a light spring 75.

The arm 66 is provided with a pin 76 which extends through a slot 78 in a cable fitting 80 secured to the end of a flexible cable 82. The cable extends through a housing 84 secured to the backing plate 20 and thence through the backing plate. There is interposed between the housing 84 and the fitting 80 a spring 86 for maintaining the cable extended except when a pull is exerted on the cable in actuating the brake thereby.

In the normal operation of the brake, fluid under pressure introduced into the cylinder 72 exerts force on the piston 70 which acting through the rod 68 turns the lever 60 about its pivot on the anchor 28. The cam edge 55 of the lever contacting with the lug 54 turns the cam lever 50 and this spreads the shoes into drum contact floating with the shoes as they shift to anchor on one or the other shoe depending on the direction of drum rotation. The pin 76 moves in the slot 78 while the spring 86 maintains the cable 82 extended.

For emergency operation or for parking, a pull may be exerted on the cable 82. This operates also to turn the lever 60 and thus spread the shoes in a manner similar to that just described above. However, the piston rod 68 in this case moves away from contact with the piston 70, the air pressure on the outer face of piston 70 maintaining it in the position shown.

The piston rod may be formed as shown in Figure 3 in order to determine more surely and definitely the return position of the piston, and to prevent the suction of air into the cylinder. Therein the rod 168 is formed of a pair of telescoping sleeves 167 and 169 and interposed between the sleeves is a compression spring 165. The piston 170 is provided with a flange 171 which coacts with the outer end of the cylinder 172 to determine the released position of the piston. The spring 165 should be stronger than the spring 75, but weaker than the spring 48.

In the arrangement shown in Figure 4, the lever 260 pivoted on the anchor 228 has an oppositely extending arm 261 which contacts the lug 254 and the lever 266 which is entirely separate from the lever 260 and is separately pivoted on the anchor 228 also contacts the lug 254. The lug 254 which is relatively long, is carried by the floating cam lever 250. The cam lever thus may be operated either by a piston through the piston rod 268 and the lever 260, or by a cable such as the cable 282 through the lever 266. The floating lever is formed with lugs 256 which are interposed between the ends of the brake shoes 224 and 226.

In the form shown in Figure 5, the lever 360 is pivoted on the anchor 328 and is formed with an arm 364 which is pivotally connected to the piston rod 368 and with a short arm 366 to which there is pivoted at 367 the auxiliary lever 369. The auxiliary lever 369 is arranged normally to bear on the arm 366 at 371 and when the lever 369 is operated by a cable (382) actuates the lever 360. The floating cam lever 350 carries the shoe actuating lugs 356 and a third lug 354. The lug 354 normally bears on the cam surface 355 of the lever 360 and the cam lever 350 is thus operated by movement of the lever 360 to spread the shoes 324 and 326.

It is to be understood that the above described embodiments of my invention are for the purpose of illustration only and various changes may be made therein without departing from the spirit and scope of my invention.

I claim:

1. A brake comprising a support, a floating friction means, a floating lever mounted between the ends of said friction means, two separate means for actuating said floating lever, one of said operating means comprising a cylinder and piston, and means comprising a spring interposed between said lever and the piston for maintaining said piston in its inactive position even though the brake is being applied by the other operating means.

2. A brake comprising a backing plate, an anchor secured to said backing plate, a floating friction means, a floating lever mounted between the ends of said friction means, and two separate means for actuating said floating lever, said separate means each including a lever pivoted on said anchor.

3. A brake comprising a backing plate, an anchor secured to said backing plate, a floating friction means, a floating lever mounted between the ends of said friction means, and two separate means for actuating said floating lever, said separate means each including a lever pivoted on said anchor, and said floating lever carrying a lug adapted to contact with either of said other levers.

4. A brake comprising a drum, a support, a floating friction means, an actuating means comprising a lever floatingly mounted between the ends of said friction means, a lever mounted on a pivot fixed relative to said support, means whereby said fixed pivot lever operates said floating lever, and two separate means for operating said fixed pivot lever.

5. A brake comprising a drum, a support, a floating friction means, an actuating means comprising a lever floatingly mounted between the ends of said friction means, a lever mounted on a pivot fixed relative to said support, means whereby said fixed pivot lever operates said floating lever, and two separate means for operating said fixed pivot lever, one of said levers carrying a lug and the other being provided with a cam surface with which said lug contacts.

6. A brake comprising a drum, a support, a floating friction means, an actuating means comprising a lever floatingly mounted between the ends of said friction means, a lever mounted on a pivot fixed relative to said support, means whereby said fixed pivot lever operates said floating lever, and two separate means for operating said fixed pivot lever, said fixed pivot lever having two arms one of which is connected to each of said operating means.

7. A brake comprising a drum, a support, a floating friction means, an actuating means comprising a lever floatingly mounted between the ends of said friction means, a lever mounted on a pivot fixed relative to said support, means whereby said fixed pivot lever operates said floating lever, and two separate means for operating said fixed pivot lever, said fixed pivot lever carrying an auxiliary lever thereon connected to one of said operating means.

8. A brake comprising a drum, a support, a floating friction means, an actuating means comprising a lever floatingly mounted between the ends of said friction means, an anchor pin fixed relative to said support on which said friction means anchors, a fixed pivot lever pivotally mounted on said anchor, means whereby said fixed pivot lever operates said floating lever, and two separate means for operating said fixed pivot lever.

9. A brake comprising a backing plate, an anchor secured to said backing plate, a floating friction means, a floating lever mounted between the ends of said friction means, and means for actuating said floating lever, said actuating means including a lever pivoted on said anchor and arranged to contact said floating lever, a hydraulic cylinder having a piston, and a cable, said piston and cable being arranged to actuate said floating lever separately.

10. A brake comprising a backing plate, a floating friction means, a floating lever mounted between the ends of said friction means, a lever pivoted on said anchor for at times operating said floating lever, a hydraulic cylinder for at times operating said pivoted lever, and a cable connected to said floating lever.

HAROLD G. AXTMANN.